Oct. 28, 1969     A. HYMAN     3,475,029

NON-MATERIAL AIMING TARGET

Filed Jan. 20, 1967     3 Sheets-Sheet 1

INVENTOR.
Abraham Hyman
BY
John M. Pearce

Oct. 28, 1969　　　A. HYMAN　　　3,475,029
NON-MATERIAL AIMING TARGET
Filed Jan. 20, 1967　　　3 Sheets-Sheet 2
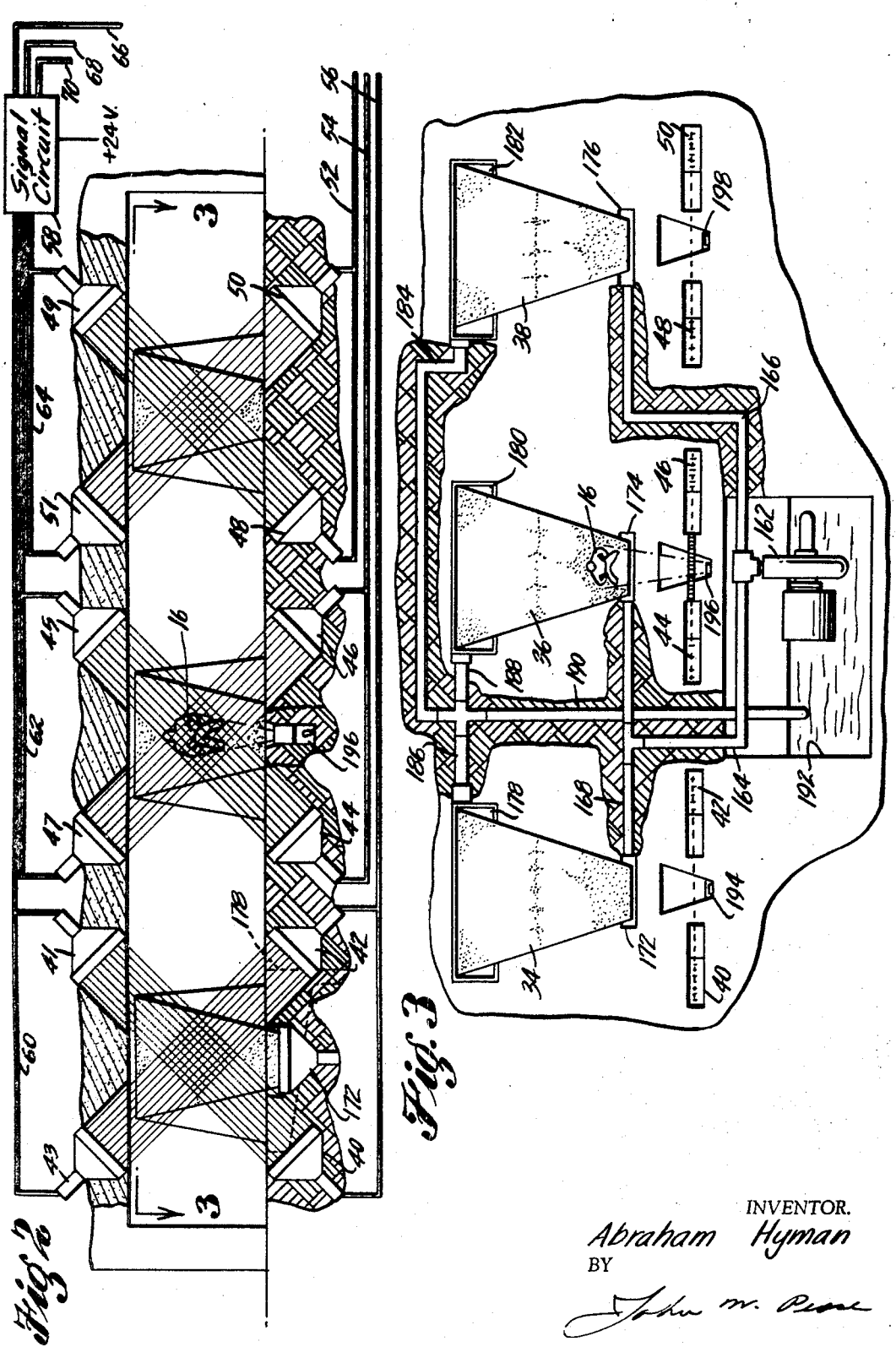
INVENTOR.
Abraham Hyman
BY Oct. 28, 1969  A. HYMAN  3,475,029

NON-MATERIAL AIMING TARGET

Filed Jan. 20, 1967  3 Sheets-Sheet 3

INVENTOR.
Abraham Hyman
BY

United States Patent Office 3,475,029
Patented Oct. 28, 1969

3,475,029
NON-MATERIAL AIMING TARGET
Abraham Hyman, New Hyde Park, N.Y., assignor to the United States of America as represented by the Secretary of the Navy
Filed Jan. 20, 1967, Ser. No. 610,701
Int. Cl. A63b *71/08, 69/00*
U.S. Cl. 273—102.2                                    2 Claims

ABSTRACT OF THE DISCLOSURE

A missile scoring detection system having spaced photoelectric sensing elements positioned to define a plurality of segmented indestructible target light matrices through which a missile may be propelled, a pumping system for establishing a fluid screen aligned with each target matrix, projectors for visually displaying indestructible target images on said fluid screen substantially aligned with said target matrices in line of intended missile fire, a signal circuit including transistors and AND gates responsive to said sensors in the passage of a missile through each segment of said matrices to develop output electrical signals, an electric display matrix responsive to said electrical signals for indicating the resultant accuracy of fire, and an instructor operated timer for unprogramed selection of the timing, location and duration of the projected images on said fluid screen.

Background of the invention

This system is particularly useful in the field of aiming targets used to train students in the art of firing a weapon.

Various types of prior art devices have been developed with a view to providing economy of target cost, instruction time and target set-up time. Examples of prior efforts are targets of such types as metal, metals in deflecting forms, plastic, cardboards, replaceable front targets, magnetic loop devices, photosensitive optical triggering screens, infrared sensing devices and impact sensing devices.

The above described systems have been found unsatisfactory because of one or more of the factors including the cost of target replacement, the inability to continuously reuse the target, the cost in time to set up and take down targets and the time, hazard and unreliability of reading the target score as well as the inability to move targets sufficiently rapidly to simulate real life targets.

Summary of the invention

The subject invention, while common with the prior art in the use of some elements, such as non-material matrices and detector systems, departs therefrom in other elements and combinations of elements which result in apparatus eliminating each of the previously mentioned disadvantages of the prior art devices. In particular, the subject system provides by way of an indestructible target matrix and indestructible target display and a coded system target display panel, the combined advantages of a target continuously reuseable without alteration, immediate operation without set-up time, elimination of hazards and time of target score checking, together with precision and reliability of scoring. In a further aspect, the invention provides by way of a programmed and timed projection apparatus the real life appearance and disappearance of targets in various locations and timed sequence, together with the advantage of variation of target forms.

Other objects and advantages of the invention will appear from the following description of an example of the invention when considered in connection with the accompanying drawings, and the novel features will be particularly pointed out in the appended claims.

Brief description of the drawings

FIGURE 2 is an elevational view partly broken away of a portion of target area equipment shown in FIGURE 1;

FIGURE 3 is a plan view taken on line 3—3 of FIGURE 2;

Description of the preferred embodiment

Figure 1:
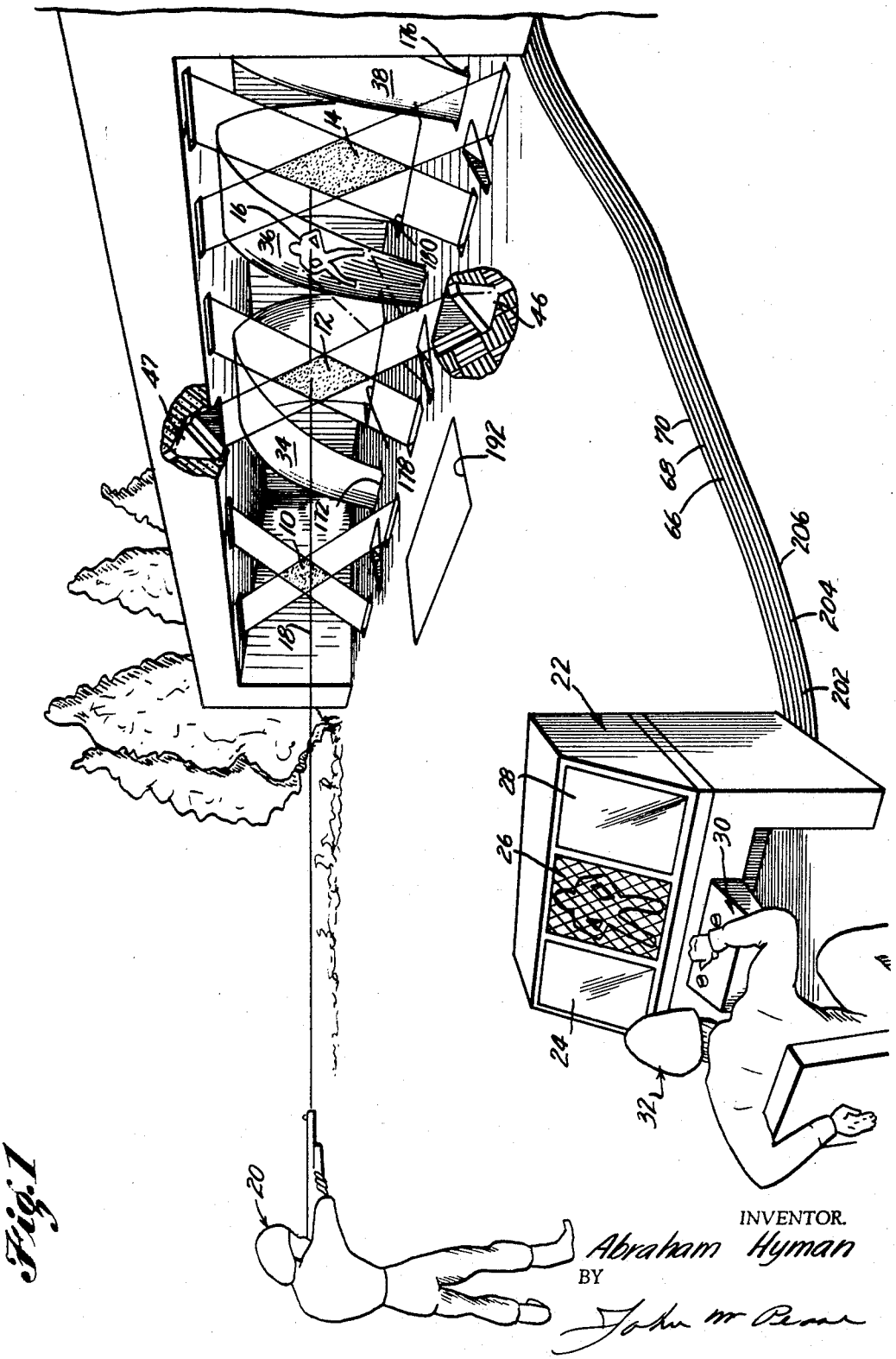
FIGURE 1 is a pictorial perspective of an overall score detection system incorporating the invention.

Referring to FIGURE 1 of the drawings, there is shown in pictorial perspective a missile firing score detection system incorporating the invention. The system as shown in FIGURE 1 comprises in general, means providing a plurality of missile detection matrices indicated at 10, 12, and 14, means providing indestructible images, as for example image 16, aligned with its associated matrix 12 in the line of fire indicated at 18, of a trainee 20, and a display circuit means indicated at 22 and located at the firing line for monitoring on display matrix panels 24, 26 and 28 the actual missile firing score through the missile detection matrices 10, 12 and 14. Also provided are means including a control panel 30 by which an instructor 32 can vary the sequence and time duration of images producible at the target areas. Each target image is projected as will be described on a formation of fluidized material, as for example a finely divided powder, smoke, or a liquid propelled in a substantially flat spray as indicated by sprays 34, 36 and 38.

To form the matrices 10, 12 and 14, I provide as shown in FIGURE 2, a plurality of collimated light beam sources 40, 42, 44, 46, 48 and 50. Each light source provides several adjacent parallel light beams forming a group of light beams. The sources are arranged in pairs, as for example pairs 40–42, 44–46 and 48–50, and angled to provide a crossing of the light beams forming from each associated pair of light sources a matrix of discrete zones, each zone associated with a pair of light beams. Positioned to receive each group of light beams is provided an associated light detector means, each detector means having a group of light sensitive detection elements in a common housing. Thus, the light sensitive detector means 41, 43, 45, 47, 49 and 51 are provided respectively for the light sources 40, 42, 44, 46, 48 and 50, the latter being energized from suitable electrical power supply cables indicated at 52, 54 and 56.

As shown in FIGURE 2, a suitable signal sensor circuit 58 is connected to each light sensitive detector means by cables 60, 62 and 64 to sense variation in voltage in each light sensitive detector element and provide an output light interruption signal corresponding thereto. The output signals are passed on cables 66, 68 and 70 to the display circuit means 22 where pairs of signals corresponding to each light crossing zone of each missile detection matrix are gated to provide visual indication on corresponding zones of display matrices 24, 26 and 28.

Figure 4:
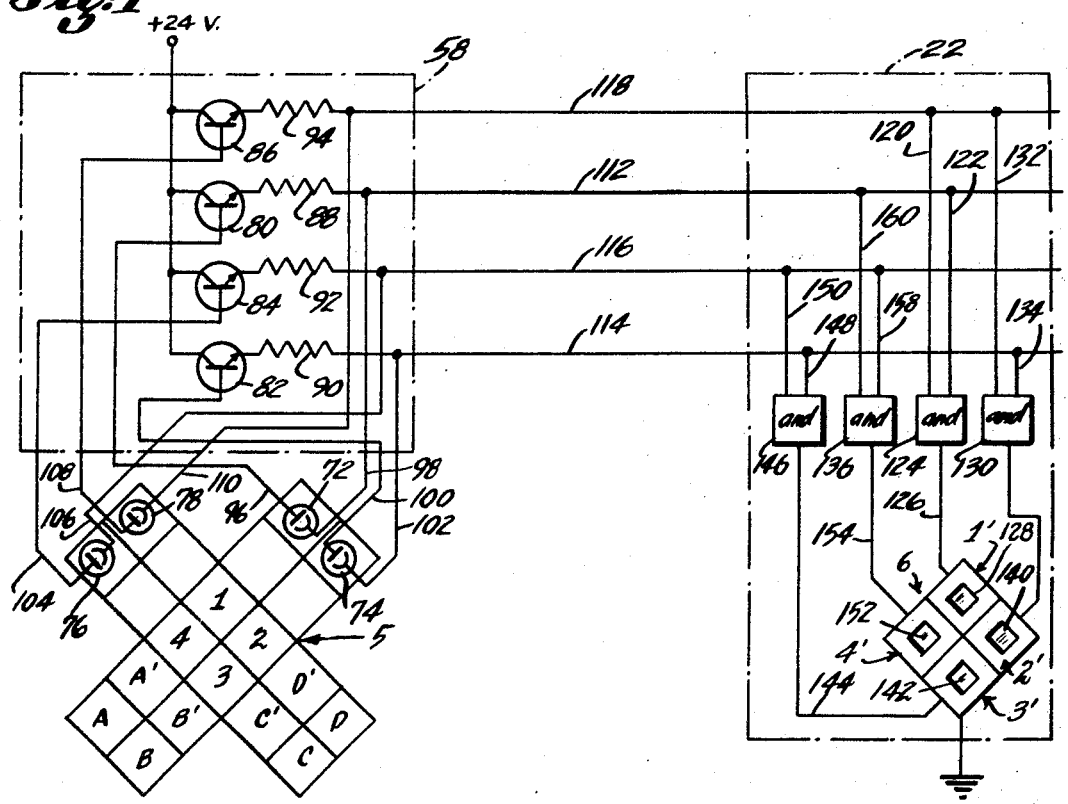
FIGURE 4 is an electrical schematic used to describe the scoring operation of the system.

For a more detailed description of the operation and functional relationships of the several devices and connecting circuitry of FIGURE 2 described generally above, attention is directed to FIGURE 4. FIGURE 4 is a simplified arrangement showing in detail apparatus for only two pairs of crossing light beams to avoid complication of the drawing. Thus, in FIGURE 4 are shown light sources A, B, C and D providing collimated light beams $A^1$, $B^1$, $C^1$ and $D^1$. Photo-conductors 72, 74, 76 and 78 are positioned to sense the respective light beams $A^1$, $B^1$, $C^1$ and $D^1$. Transistors 80, 82, 84 and 86 and associated resistors 88, 90, 92 and 94 are connected to a source of positive voltage indicated and to respective photo-conductors 72, 74, 76 and 78 by the pairs of lines 96–98, 100–102, 104–106 and 108–110 as shown. In this manner the transistors 80, 82, 84 and 86 are in blocked condition by the voltage developed by the respective photo-conductors, but will pass current to the respective output lines 112, 114, 116 and 118 when the photo-conductor voltage is lowered by a missile interrupting the light of its associated beam. Thus, for example, crossing light beams $A^1$, $B^1$, $C^1$ and $D^1$ define a missile detection matrix 5 having light crossing zones 1, 2, 3 and 4. Zone 1, the crossing of light beams $A^1$ and $D^1$ is monitored by photo-conductors 78 and 72. An interruption of light in Zone 1 by the passing of a missile therethrough lowers the output voltage of photo-conductor 72, triggering transistor 80 and providing an output signal on line 112. A missile passing through Zone 1 also lowers the voltage output of photo-conductor 78 and triggers transistor 86 to provide an output signal on line 118. The simultaneous signals on lines 112 and 118 are passed by lines 120 and 122 to an AND gate 124 which thereupon provides a single output signal on line 126 to a Zone $1^1$ of a display matrix 6. This signal operates any suitable indicating device in Zone $1^1$ of matrix 6. It could, for example, flash a light. However, it is preferred to provide a conventional resettable counter 128 in Zone $1^1$ such that repeated hits in Zone 1 of the missile detection matrix 5 will be summed in the Zone $1^1$ counter 128 of display matrix 6.

In a similar manner, an AND gate 130 is connected by lines 132 and 134 to receive signals from lines 118 and 114 and is connected by line 136 to a counter 140 in Zone $2^1$ to record the passing of a missile through Zone 2 of the missile detection matrix 5. Zone $3^1$ of matrix 6 is provided with a counter 142 connected by a line 144 to an AND gate 146 which in turn is connected by lines 148 and 150 to respective lines 114 and 116. Zone $4^1$ of matrix 6 is provided with a counter 152 connected by a line 154 to an AND gate 156 which in turn is connected to lines 116 and 112 by respective lines 158 and 160.

In general then, a missile score in any zone of the missile detection matrix 5 produces a positive indication in a corresponding zone of the display matrix 6. Thus, as shown in FIGURE 1, a missile fired through missile detection matrix 12 provides an indication on the display matrix 26 at the instructor's display cabinet 22. A score in missile detection matrices 10 or 14 would be recorded on respective matrices 24 and 28.

Referring to FIGURES 1 and 3, means are provided for selectively intermittently displaying an indestructible projected image in alignment with an associated missile detection matrix and in line of missile fire through said matrix.

Thus, as shown in FIGURE 1, substantially planar sprays 34, 36 and 38 of fluidized material are provided by suitable apparatus. Such sprays could be a smoke, a finely divided powder or sand, or a liquid. In FIGURE 3 is shown a liquid spray apparatus comprising a pump 162 connected by conduits 164, 166, 168 and 170 to flat spray nozzles 172, 174 and 176. The sprayed material is returned by collectors 178, 180 and 182 and return lines 184, 186, 188 and 190 to a sump 192.

Figure 5:
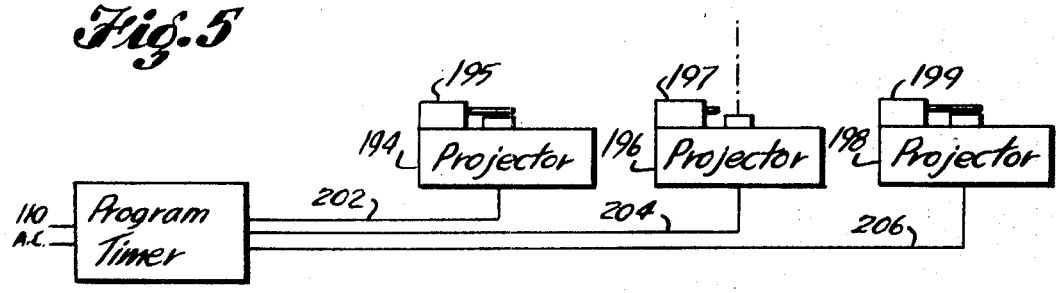
FIGURE 5 is a block schematic used to describe a programmed and timed target image projection system also shown in part in FIGURE 1.

Referring to FIGURES 3 and 5, projectors 194, 196 and 198 are provided to project a target image, as for example image 16, on its associated one of the sprays 34, 36 and 38. The projectors are supplied with suitable electrical power through a conventional program timer 200 (located in panel 30, FIGURE 1) connected thereto by cables 202, 204 and 206. Each projector includes shutter mechanisms 195, 197 and 199 or other suitable means controlled by the program timer such that the projection of images from the projectors can be selectively programmed in sequence and time duration to simulate the appearance and disappearance, location and duration of targets as viewed by the trainee. Such programming is under the control of the instructor, indicated at 32 in FIGURE 1.

In addition to the advantages of target cost, time saved, reliability of scoring, reduction of hazard and other factors mentioned hereinbefore, the subject scoring system is particularly useful as a training device in the following areas. It provides realistic targets because the projected images can be changed and varied as to shape and form and the displayed image can be controlled in time duration and physical location. Also as the trainee fires a successive number of shots, the particular characteristics of fire can be noted by the instructor. That is, the trainee's shots may be initially on target and wander off thereafter or vice versa. This gives the instructor an idea of what the student is doing wrong and enables the instructor to suggest corrections. The system also has the inherent advantage of summing repeat scores in the same target matrix zone.

Any suitable light source or radiant energy source may be used for the devices 40, 42, 44, 46 and 48. For example, infrared, neon mercury arc, high intensity automotive or aircraft lights, are some examples. The light source need not be limited to visible light. Conventional means of slots and focusing lens (not shown) are incorporated into the light sources to form collimated light beams.

It is contemplated also that instead of a plurality of target matrices and a plurality of separate target sprays, one broad continuous matrix and one broad continuous spray can be used. In such arrangement, a plurality of projectors can be used as described hereinbefore, or one or more projectors can be arranged and programmed to provide a moving image with selection of time duration. The use and arrangement of projectors will depend upon the target scene to be realistically displayed to the firing line.

It will be understood that various additional changes in the details, materials, and arrangements of parts, which have been herein described and illustrated in order to explain the nature of the invention, may be made by those skilled in the art within the principle and scope of the invention as expressed in the appended claims.

I claim:
1. A missile firing score detection system comprising in combination
   (a) a plurality of light matrices each formed of a plurality of collimated light beam sources and a plurality of light sensitive detectors cooperatively spaced and directed to form therebetween and in a plane a missile detection matrix of crossing light beams between said sources and detectors,
   (b) signal circuit means connected to said detectors in pairs of detectors, each pair of detectors being selected as associated with a particular area of one of said matrices defined by the crossing rays received by said detector pair to provide dual light interruption signals responsive to the entry of a missile in each area of one of said matrices,
   (c) display circuit means connected to receive said light interruption signals and provide visual indication of the area of each of said light matrices penetrated by a missile,
   (d) pump means producing for each light matrix a planar spray of liquid material aligned with and substantially parallel to said light matrix,
   (e) projector means for projecting on each spray a visible target image,
   (f) program timer means under the control of an instructor for selectively projecting in selectively unprogrammed manner the sequence and time duration of target images at the different light matrices to simulate the appearance and disappearance, location and duration of targets as viewed by a trainee.

2. A missile firing score detection system according to claim 1,
(a) said signal circuit means including for each light sensitive detector a transistor and resistor connected in series, each detector being connected to the base of its associated transistor and to an output end of said resistor to provide, when said transistor is energized, an electrical signal responsive to interrupting light to said light sensitive detector,
(b) said display circuit means including for each pair of said associated pairs of detectors an indicator means and an AND circuit,
(c) said AND circuit being connected to receive said light interruption signals and to activate said indicator means when said AND circuit receives simultaneous interruption signals,
(d) said indicator means including a counter for and connected to each AND circuit to visually indicate a hit in each cross ray area of said light matrices and to sum the hits in each area.

References Cited

UNITED STATES PATENTS

| | | |
|---|---|---|
| 1,207,411 | 12/1916 | Keen _____ 273—105.1 |
| 2,767,987 | 10/1956 | Klose. |
| 2,934,346 | 4/1960 | Mongello. |
| 3,022,076 | 2/1962 | Zito. |
| 3,047,723 | 7/1962 | Knapp. |
| 3,061,727 | 10/1962 | Roth et al. |
| 3,076,897 | 2/1963 | Skirvin _____ 250—209 |
| 3,025,406 | 3/1962 | Stewart et al. |
| 3,097,303 | 7/1963 | Ulrich _____ 250—222 |

FOREIGN PATENTS 429,860   7/1911   France.

ANTON O. OECHSLE, Primary Examiner

MAX R. PAGE, Assistant Examiner

U.S. Cl. X.R.

250—222; 273—105.1